(12) United States Patent
Chu et al.

(10) Patent No.: US 9,032,485 B2
(45) Date of Patent: May 12, 2015

(54) ANCHOR AUTHENTICATOR RELOCATION METHOD AND SYSTEM

(75) Inventors: Li Chu, Shenzhen (CN); Ge Zhu, Shenzhen (CN); Chengyan Feng, Shenzhen (CN); Hongyun Qu, Shenzhen (CN); Ling Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 95 days.

(21) Appl. No.: 13/635,685

(22) PCT Filed: Dec. 31, 2010

(86) PCT No.: PCT/CN2010/080610
§ 371 (c)(1),
(2), (4) Date: Sep. 17, 2012

(87) PCT Pub. No.: WO2011/113292
PCT Pub. Date: Sep. 22, 2011

(65) Prior Publication Data
US 2013/0014231 A1    Jan. 10, 2013

(30) Foreign Application Priority Data
Mar. 18, 2010 (CN) .......................... 2010 1 0147306

(51) Int. Cl.
*H04W 36/00* (2009.01)
*H04W 12/06* (2009.01)
(Continued)

(52) U.S. Cl.
CPC ...... *H04W 36/0038* (2013.01); *H04W 36/0005* (2013.01); *H04W 36/0033* (2013.01); *H04W 12/06* (2013.01); *H04L 63/0892* (2013.01)

(58) Field of Classification Search
CPC ......... H04L 63/0892; H04W 36/0038; H04W 36/0033; H04W 36/0005; H04W 12/06
USPC ............................................................ 726/4
See application file for complete search history.

(56) References Cited

U.S. PATENT DOCUMENTS 7,561,692 B2    7/2009   Altshuller
2007/0201697 A1 8/2007   Altshuller
(Continued)

FOREIGN PATENT DOCUMENTS

CN   1996911 A     7/2007
CN   101039312 A   9/2007
(Continued)

OTHER PUBLICATIONS

Wang et al, Service Flow Authentication Relocation, Communications and Mobile Computing, vol. 2, pp. 303-307 (IEEE Jan. 8, 2009).*

(Continued)

*Primary Examiner* — Theodore Parsons
(74) *Attorney, Agent, or Firm* — Oppedahl Patent Law Firm LLC

(57) ABSTRACT

The disclosure provides an anchor authenticator relocation method and system. The method includes: after an old authenticator accepts an anchor authenticator relocation request of a Mobile Station (MS), a new authenticator sends an authenticator relocation request to an AAA server; when the AAA server's verification on the new authenticator is passed and the old authenticator confirms that the new authenticator is trusted, the anchor authenticator is relocated to the new authenticator. The disclosure provides a detailed solution to perform anchor authenticator relocation without re-authentication.

20 Claims, 5 Drawing Sheets

(51) Int. Cl.
*H04W 12/04* (2009.01)
*H04L 29/06* (2006.01)

(56) References Cited

U.S. PATENT DOCUMENTS

| | | | |
|---|---|---|---|
| 2008/0076424 A1* | 3/2008 | Barber et al. | 455/436 |
| 2009/0116651 A1* | 5/2009 | Liang et al. | 380/278 |
| 2010/0228967 A1* | 9/2010 | Hahn et al. | 713/155 |
| 2010/0232407 A1* | 9/2010 | Navali et al. | 370/338 |
| 2010/0332361 A1* | 12/2010 | Zhou | 705/30 |
| 2011/0076987 A1* | 3/2011 | Lee et al. | 455/411 |
| 2011/0107085 A1* | 5/2011 | Mizikovsky | 713/155 |
| 2011/0125620 A1* | 5/2011 | Wisenoecker et al. | 705/30 |
| 2011/0129088 A1* | 6/2011 | Lee et al. | 380/44 |
| 2011/0238834 A1* | 9/2011 | Nair et al. | 709/225 |
| 2012/0020343 A1* | 1/2012 | Sugizaki et al. | 370/338 |

FOREIGN PATENT DOCUMENTS

| | | |
|---|---|---|
| CN | 101079692 A | 11/2007 |
| CN | 101079702 A | 11/2007 |
| CN | 101635925 A | 1/2010 |
| CN | 101656944 A | 2/2010 |
| JP | 2008141374 A | 6/2008 |
| JP | 2009153042 A | 7/2009 |
| JP | 2009188616 A | 8/2009 |
| JP | 2010530181 A | 9/2010 |
| WO | 2008152681 A1 | 12/2008 |
| WO | 2008157123 A1 | 12/2008 |
| WO | 2009118980 A1 | 10/2009 |
| WO | 2009147132 A1 | 12/2009 |

OTHER PUBLICATIONS

International Search Report on international application No. PCT/CN2010/080610, mailed on Apr. 7, 2011.

English Translation of the Written Opinion of the International Search Authority in international application No. PCT/CN2010/080610, mailed on Apr. 7, 2011.

\* cited by examiner

ANCHOR AUTHENTICATOR RELOCATION METHOD AND SYSTEM

TECHNICAL FIELD

The disclosure relates to Worldwide Interoperability for Microwave Access (WiMAX) network techniques, and in particular to an anchor authenticator relocation method and system.

BACKGROUND

As a new 4-th generation (4G) communication standard, WiMAX has drawn a great concern of telecommunication providers and equipment manufacturers over the world and thus dominate the wireless wide band field. FIG. 1 is a schematic view of the structure of the existing WiMAX network. As shown in FIG. 1, a WiMAX network may mainly consist of a plurality of network elements, such as a Mobile Station (MS), a Base Station (BS), an Access Gateway (AGW, not shown in FIG. 1), an authenticator, and an Authentication, Authorization and Accounting (AAA) server, etc. The AGW, BS and authenticator are located in an Access Service Network (ASN), and the AAA server is located in a Connection Service Network (CSN).

When the MS initially enters the network, the network will assign an authenticator and a home AAA (HAAA) server in the ASN to authenticate the MS, both of which are referred to as an anchor authenticator of the MS. Before the life cycle or timer for some security parameters expires, the MS or the network side will have to initiate re-authentication. At this time, authenticator relocation may occur along with the re-authentication. Accordingly, a new authenticator may become the anchor authenticator of the MS.

At present, in some scenarios, re-authentication occurs along with the anchor authenticator relocation, while in other scenarios, anchor authenticator relocation is performed without re-authentication. For example, in the case where the anchor authenticator, an anchor data channel functionality and an anchor paging controller are in a same entity gateway, relocation of the anchor data channel functionality and the anchor paging controller may occurs without re-authentication.

In some scenarios in practice, anchor authenticator relocation may be necessary, but it is unnecessary for other logic entities, such as the data channel functionality and the anchor paging controller, to be relocated. Currently, there is no implementation which is directed to individual anchor authenticator relocation without re-authentication.

SUMMARY

In view of the above, the disclosure provides an anchor authenticator relocation method and system, which is capable of implementing anchor authenticator relocation without re-authentication.

For the above purposes, the technical solutions according to the disclosure are provided as follows.

An anchor authenticator relocation method includes the following steps:
  after an old authenticator accepts an anchor authenticator relocation request of a MS, a new authenticator sends an authenticator relocation request to an AAA server.
  When the new authenticator passes the AAA server's verification and the old authenticator confirms that the new authenticator is trusted, the anchor authenticator is relocated to the new authenticator.

The method may further include the following steps which are performed in the first place, or performed after the old authenticator accepts the anchor authenticator relocation request of the MS and before the new authenticator sends the anchor authenticator relocation request to the AAA server:
  sending, by the old authenticator, the AAA server a notification message, which notifies the AAA server of the new authenticator to be switched to and of the new authenticator related information or a security parameter $X_1$ provided by the old authenticator, so as for the AAA server to verify the new authenticator.

The anchor authenticator relocation request may be initiated by the new authenticator or the old authenticator.

The method may further include: rejecting, by the old authenticator, the anchor authenticator relocation request, when detecting that an act of re-authentication or authenticator relocation is in progress.

The old authenticator may detect whether the act of re-authentication or authenticator relocation is in progress in the following way: setting in the old authenticator an anchor authenticator relocation locking state identifier for the MS, when the anchor authenticator relocation locking state identifier indicates a locking state, rejecting any other authenticator relocation request and/or re-authentication request until the authenticator relocation locking state is removed; or, setting in the old authenticator a counter for the MS; when a value of the counter is an odd number, rejecting any other authenticator relocation request and/or re-authentication request; or, setting in the old authenticator a timer for the MS when the authenticator relocation of the MS occurs in the old authenticator, rejecting any other authenticator relocation request and/or re-authentication request until the timer runs out of time.

The method may further include: setting, by the old authenticator, a re-authentication locking state for the MS, wherein in the re-authentication locking state, no other re-authentication is accepted.

The method may further include: rejecting, by the old authenticator, the anchor authenticator relocation request, when detecting that an act of re-authentication or authenticator relocation is in progress.

The passing of the AAA server's verification on the new authenticator may comprise: verifying, by the AAA server, the new authenticator by using a security parameter under a Remote Authentication Dial In User Service (RADIUS) protocol or a Diameter protocol; and regarding the verification as passing when the security parameter provided by the old authenticator is identical to the security parameter provided by the new authenticator.

The verification may comprise: sending, by the new authenticator, the AAA server the authenticator relocation request, which includes an NAI for the MS, a security parameter Z provided by the old authenticator or a security parameter W calculated from the security parameter Z, and is to request for verification of the AAA server; determining, by the AAA server, whether an available security parameter, or the security parameter Z1 local to the AAA server, or a security parameter W calculated from the local security parameter Z1 is identical to a security parameter from the new authenticator, and if yes, regarding the verification as passing.

The authenticator relocation request sent to the AAA server by the new authenticator may further include an FQDN of the new authenticator, or a security parameter X provided by the old authenticator, or a security parameter Y calculated from the security parameter X provided by the old authenticator.

The verification may further comprise: determining whether the security parameter X received from the new authenticator is identical to a security parameter X1 received from the old authenticator, or whether the security parameter Y1 is identical to the security parameter Y, based on the FQDN of the new authenticator provided by the old authenticator, or the security parameter X1 provided by the old authenticator, or the security parameter Y1 calculated from the security parameter X1, and if yes, regarding the verification as passing.

The relocating the anchor authenticator to the new authenticator when the old authenticator confirms that the new authenticator is trusted may comprise: requesting, by the new authenticator, a Mobile Station (MS) context from the old authenticator; and returning, by the old authenticator when confirming that the new authenticator is trusted, the MS context to the new authenticator.

The old authenticator may further return an old Master Session Key (MSK) corresponding to the MS to the new authenticator.

The confirming that the new authenticator is trusted may comprise: returning to the old authenticator, by the new authenticator, a security parameter U or a security parameter V acquired from the AAA server; determining, by the old authenticator, whether a locally available security parameter U1 is identical to the security parameter U from the new authenticator, or whether a security parameter V1 calculated from the local security parameter U1 is identical to security parameter V from the new authenticator, and if yes, confirming that the new authenticator is trusted.

The method may further include: where an authenticator relocation locking state has been set previously, removing the authenticator relocation locking state for the MS.

The method may further include: where a re-authentication locking state has been set previously, removing the re-authentication locking state for the MS.

The method may further include: sending, by the new authenticator, an authenticator relocation complete acknowledgement message to the old authenticator; clearing up, by the old authenticator when acknowledging that the relocation is successfully completed, the MS related information.

An anchor authenticator relocation system includes at least a new authenticator, an old authenticator and an Authentication, Authorization and Accounting (AAA) server, wherein the new authenticator is configured to interact with the old authenticator, to send an authenticator relocation request of a Mobile Station (MS) to the AAA server after the old authenticator accepts an anchor authenticator relocation request, and to request the old authenticator to perform the authenticator relocation upon receipt of a verification pass response from the AAA server;

the old authenticator is configured to interact with the new authenticator, to accept the anchor authenticator relocation request of the MS, to send an authenticator relocation success or complete response to the new authenticator when determining the new authenticator is trusted, and to relocate the anchor authenticator to the new authenticator; and the AAA server is configured to verify the new authenticator and to send a verification pass response to the new authenticator when the verification is passing.

The old authenticator may further be configured to reject the anchor authenticator relocation request, when detecting that an act of re-authentication or authenticator relocation is in progress.

The old authenticator may further be configured to set an authenticator relocation locking state for the MS when accepting the anchor authenticator relocation request, and accordingly, to remove the authenticator relocation locking state for the MS when confirming that the new authenticator is trusted.

The old authenticator is specifically configured to set setting an anchor authenticator relocation locking state identifier for the MS, and reject any other authenticator relocation request and/or re-authentication request until the authenticator relocation locking state is removed, when the anchor authenticator relocation locking state identifier indicates a locking state; or, to set a counter for the MS, and reject any other authenticator relocation request and/or re-authentication request when a value of the counter is an odd number; or, to set in the old authenticator a timer for the MS when the authenticator relocation of the MS occurs in the old authenticator, and reject any other authenticator relocation request and/or re-authentication request until the timer runs out of time; the old authenticator may further be configured to set a re-authentication locking state for the MS, and accordingly, to remove the re-authentication locking state for the MS when confirming that the new authenticator is trusted.

The old authenticator may further be configured to send the AAA server a notification message, which notifies the AAA server of the new authenticator to be switched to and of the new authenticator related information, or a security parameter provided by the old authenticator, so as for the AAA server to verify the new authenticator.

The new authenticator may further be configured to send an authenticator relocation complete acknowledgement message to the old authenticator.

The old authenticator may further be configured to clear up the MS related information when acknowledging that the authenticator relocation is successfully completed.

The old authenticator may further be configured to initiate a process causing the MS to exit the network when there is any rejection or failure response.

As can be seen from the technical solutions provided by the disclosure, after an old authenticator accepts an anchor authenticator relocation request of a MS, a new authenticator sends an authenticator relocation request to an AAA server. When the new authenticator passes the AAA server's verification and the old authenticator confirms that the new authenticator is trusted, the anchor authenticator is relocated to the new authenticator. The disclosure provides a detailed solution to perform anchor authenticator relocation without re-authentication.

DETAILED DESCRIPTION

Figure 1:
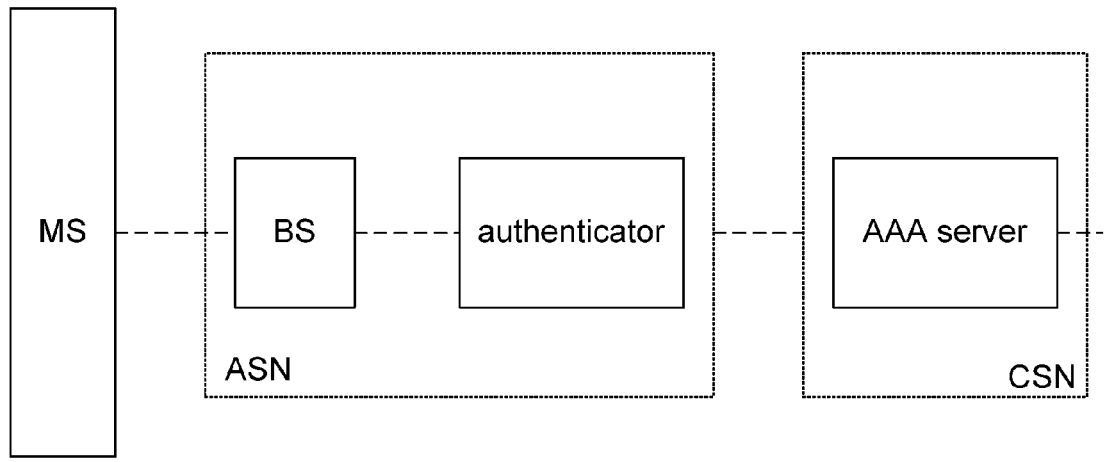
FIG. 1 is a schematic view of the structure of the existing WiMAX network.
Figure 2:
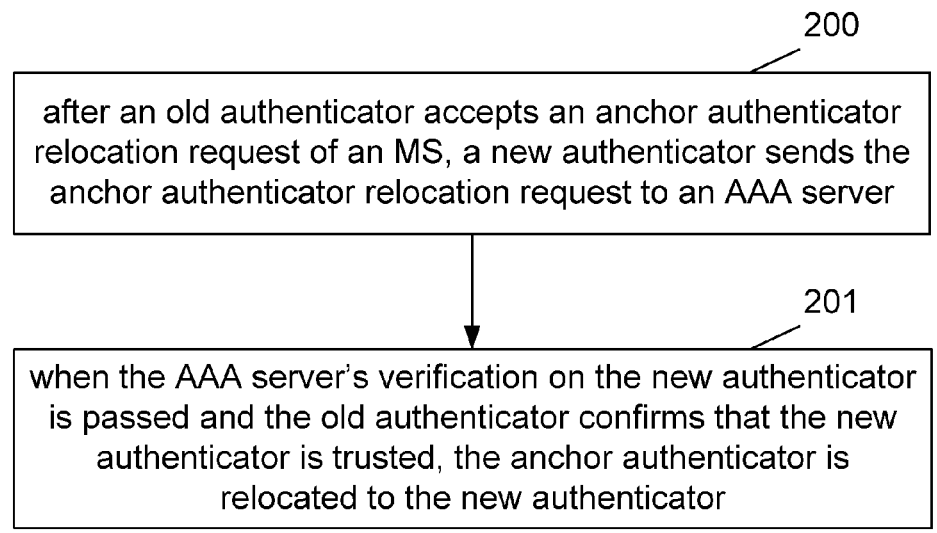
FIG. 2 is a flow chart of the anchor authenticator relocation method according to the disclosure.

FIG. 2 is a flow chart of the anchor authenticator relocation method according to the disclosure. As shown in FIG. 2, the method includes the following steps:

Step 200: after an old authenticator accepts an anchor authenticator relocation request of a MS, a new authenticator sends an authenticator relocation request to an AAA server.

In this step, the anchor authenticator relocation request may be initiated by the new authenticator (which is referred to a PULL mode), or may be initiated by the old authenticator (which is referred to as a PUSH mode). The new authenticator may be a default authenticator associated with the serving BS. In the disclosure, the AAA server refers to an HAAA server. The PULL mode and PUSH mode are known to the skilled in the art and thus the detailed description thereof will be omitted here.

If the old authenticator detects that an act of re-authentication or authenticator relocation is in progress, then the old authenticator rejects the anchor authenticator relocation request; otherwise, the old authenticator accepts the anchor authenticator relocation request, and set a corresponding state identifier (there are several specific implementations for the setting). Further, a re-authentication locking state may be set for the MS, that is, no other subsequent re-authentication request is accepted.

The old authenticator may detect whether the act of re-authentication or authenticator relocation is in progress in the following specific way:

in the old authenticator, a relocation locking state identifier is set for the MS; when relocation locking state identifier indicates a locking state, no other subsequent authenticator relocation request and/or re-authentication request is accepted, until the authenticator relocation locking state for the MS is removed;

or, in the old authenticator, a counter is set for the MS; the initial value of the counter is set as 0; when an act of authenticator relocation associated with the MS occurs in the old authenticator, the counter is incremented by 1, i.e., the value of the counter becomes 1; when the act of authenticator relocation is completed, the counter is incremented by 1, i.e., the value of the counter becomes 2; the counter is incremented one by one, and once a cycle of authentication relocation is completed, the counter is incremented by 2, until the value of the counter reaches a maximum value, at the time of which the counter is reset as its initial value 0. In this way, when the value of the counter is an odd number, it indicates that the act of authenticator relocation is in progress, and no other subsequent authenticator relocation request and/or re-authentication request is accepted; and when the value of the counter is an even number, it indicates that there is no act of authenticator relocation in progress;

or, when an act of authenticator relocation associated with the MS occurs in the old authenticator, a timer is set for the MS in the old authenticator, and is stopped upon completion of the act of authenticator relocation. When the timer runs out of time, if the authenticator relocation has not yet been completed, the old authenticator may terminate the process of authenticator relocation and determines the authenticator relocation fails. That is, during the period in which the timer has not run out of time, no other subsequent authenticator relocation request and/or re-authentication request is accepted until the timer runs out of time.

After the old authenticator accepts the anchor authenticator relocation request, the new authenticator sends the anchor authenticator relocation request to the AAA server. The anchor authenticator relocation request may be a Remote Authentication Dial In User Service (RADIUS) message or a Diameter message, which may include a Network Access Identifier (NAI) of the MS.

In this step, after the old authenticator accepts the anchor authenticator relocation request of the MS and before the new authenticator sends the authenticator relocation request to the AAA server, the following acts may further be performed: the old authenticator sends the AAA server a notification message, which notifies the AAA server of the new authenticator to be switched to and of the new authenticator related information, such as the Fully Qualified Domain Name (FQDN) of the new authenticator, or a security parameter $X_1$ provided by the old authenticator, so as for the AAA server to verify the new authenticator. The AAA server responds to the old authenticator with a notification response message. $X_1$ may be the MS related parameter information which may be provided by the old authenticator, or may be a security parameter available to both the old and new authenticators, or may be a security parameter calculated from the parameter available to both the old and new authenticators.

Step 201: when the new authenticator passes the AAA server's verification and the old authenticator confirm that the new authenticator is trusted, the anchor authenticator is relocated to the new authenticator.

In this step, the AAA server may verify the new authenticator by using the security parameter under the RADIUS protocol or Diameter protocol (for the specific implementations, please refer to the description of the embodiments hereinafter), and may return a verification pass response to the new authenticator when the verification is passed; the new authenticator may request an MS context from the old authenticator; the old authenticator, after confirming that the new authenticator is trusted (for the specific implementations, please refer to the description of the embodiments hereinafter), may return the MS context to the new authenticator; if the authenticator relocation locking state has been set previously, the old authenticator may remove the authenticator relocation locking state for the MS; if the re-authentication locking state has been set previously, the old authenticator may remove the re-authentication locking state for the MS.

Further, the method according to the disclosure may also include the following step: the new authenticator sends an authenticator relocation complete acknowledgement message to the old authenticator.

Further, the method according to the disclosure may also include the following step: the old authenticator clears up the MS related information after acknowledging that the relocation is successfully completed.

It should be noted that in the above process as shown in FIG. 2, given any rejection or failure response, the old authenticator may initiate a process causing the MS to exit the network.

Figure 3:
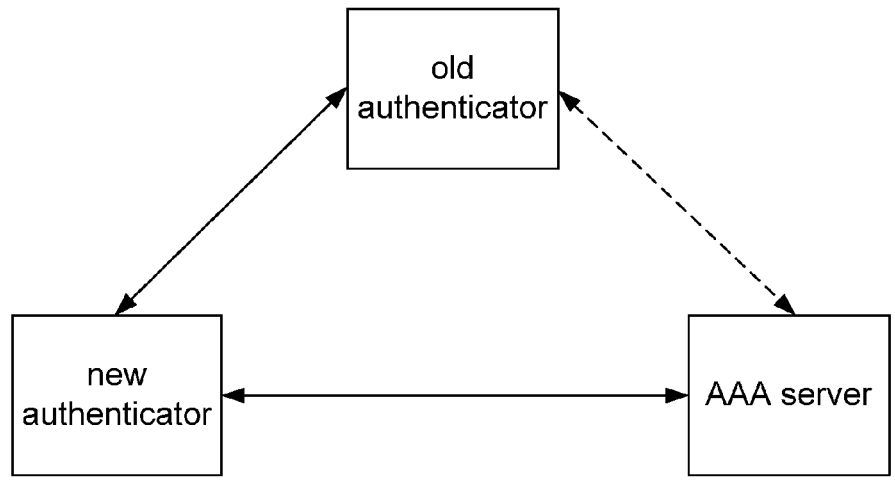
FIG. 3 is a schematic view of the structure of the anchor authenticator relocation system according to the disclosure.

The disclosure also provides an anchor authenticator relocation system. FIG. 3 is a schematic view of the structure of the anchor authenticator relocation system according to the disclosure. As shown in FIG. 3, the system includes at least a new authenticator, an old authenticator and an AAA server.

The new authenticator is configured to interact with the old authenticator, to send an authenticator relocation request to an AAA server after an old authenticator accepts an anchor authenticator relocation request of a MS; to request the old authenticator to perform the authenticator relocation upon receipt of a verification pass response from the AAA server;

and to request the old authenticator to perform the authenticator relocation upon receipt of a verification failure response from the AAA server, wherein the verification failure response includes a failure identifier.

The old authenticator is configured to interact with the old authenticator, to determine whether to accept the anchor authenticator relocation request of the MS; to send an authenticator relocation success or complete response to the new authenticator when determining the new authenticator is trusted; and to relocate the anchor authenticator to the new authenticator.

The AAA server is configured to verify the new authenticator and to send a verification pass response to the new authenticator when the verification is passed.

Further, the old authenticator may be configured to reject the anchor authenticator relocation request, when detecting that an act of re-authentication or authenticator relocation is in progress;

the old authenticator may be further configured to set an authenticator relocation locking state for the MS, when accepting the anchor authenticator relocation request of the MS; accordingly, to remove the authenticator relocation locking state for the MS when confirming that the new authenticator is trusted; Further, the old authenticator may be configured to set a re-authentication locking state for the MS, accordingly, to remove the re-authentication locking state for the MS when confirming that the new authenticator is trusted.

The old authenticator may further be configured to send the AAA server a notification message, which notifies the AAA server of the new authenticator to be switched to and of the new authenticator related information, such as the Fully Qualified Domain Name (FQDN) of the new authenticator, or a security parameter $X_1$ provided by the old authenticator, so as for the AAA server to verify the new authenticator.

The new authenticator may further be configured to send an authenticator relocation complete acknowledgement message to the old authenticator.

The old authenticator may further be configured to clear up the MS related information after acknowledging that the authenticator relocation is successfully completed.

The old authenticator may further be configured to initiate a process causing the MS to exit the network when there is any rejection or failure response.

The method of the disclosure will be described below in detail with reference to the embodiments.

Figure 4:
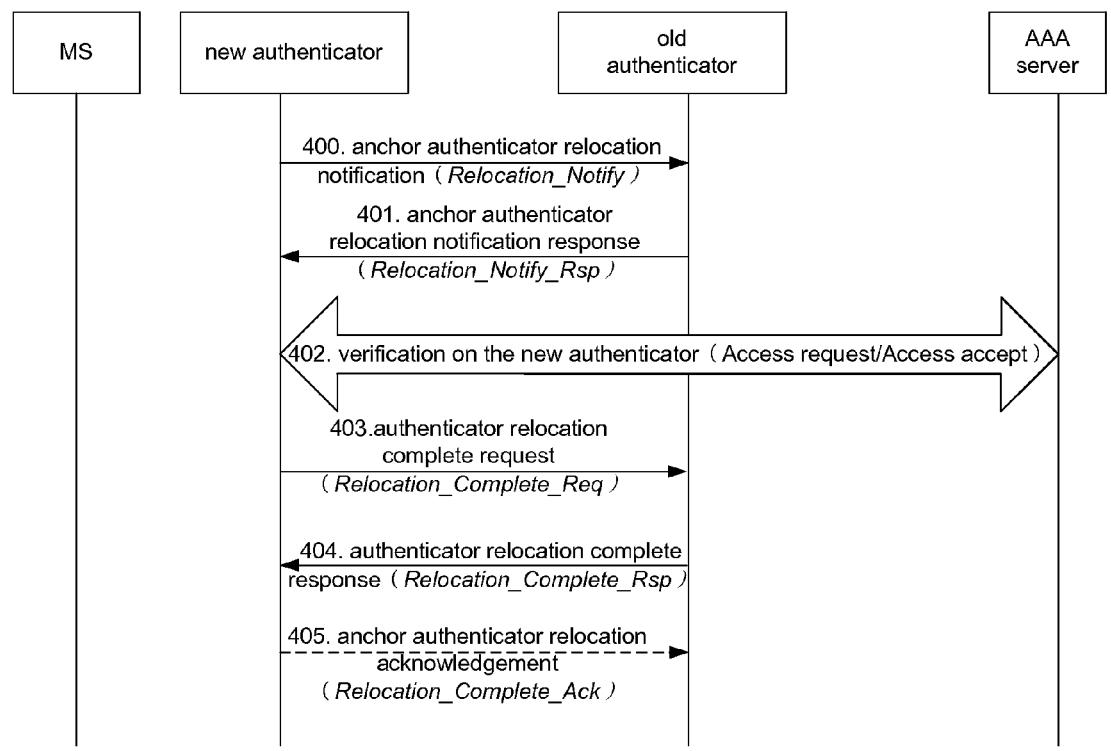
FIG. 4 is a flow chart of the anchor authenticator relocation method according to the first embodiment of the disclosure.

FIG. 4 is a flow chart of the anchor authenticator relocation method according to the first embodiment of the disclosure. FIG. 4 is a flow chart of the anchor authenticator relocation method in a PULL mode. As shown in FIG. 4, the method according to the first embodiment includes the following steps:

Step 400: a new authenticator sends an old authenticator an anchor authenticator relocation notification message for requesting authenticator relocation, i.e., initiates anchor authenticator relocation of the MS.

Step 401: the old authenticator returns an anchor authenticator relocation notification response to the new authenticator.

In this step, if the old authenticator detects that an act of re-authentication or authenticator relocation is in progress, then the old authenticator rejects the current anchor authenticator relocation request; otherwise, the old authenticator sets an authenticator relocation locking state for the MS, and no longer accepts any other subsequent re-authentication request and/or authenticator relocation request. Further, a re-authentication locking state may be set for the MS, that is, no other subsequent re-authentication request is accepted.

If the old authenticator accepts the current authenticator relocation request, an MS context requested by the new authenticator may be included in the anchor authenticator relocation notification response returned to the new authenticator, the MS context may contain one or more of the followings: MS security history, MS authorization context, REG context and anchor mobile station mobility context. Further, the anchor authenticator relocation notification response may include a security parameter Z. The security parameter Z may be parameter information available to both the old authenticator and the AAA server, or may be a security parameter calculated from the parameter available to both the old authenticator and the AAA server. The security parameter may be a cipher based authentication code key (CMAC_COUNT_KEY), or a Master Session Key (MSK). There are many existing approaches to calculate a security parameter from another security parameter, which belong to common technical means used by the skilled in the art and do not mean to limit the scope of the disclosure.

Step 402: after the new authenticator receives an acceptance response from the old authenticator, the new authenticator sends the authenticator relocation request to the AAA server, and the AAA server verify the new authenticator.

In this step, the authenticator relocation request sent to the AAA server may be an RADIUS message or a Diameter message. The RADIUS message or the Diameter message may include an MS NAI.

The request sent to the AAA server from the new authenticator may contain a security parameter Z provided by the old authenticator or a security parameter W calculated from the security parameter Z, and is to request for verification of the AAA server.

In this step, The verification of the AAA server may include: if the security parameter provided by the new authenticator is as same as the security parameter available form the AAA server, or the security parameter $Z_1$ at the AAA server or the security parameter W calculated from the security parameter $Z_1$ at the AAA server is as same as the security parameter from the new authenticator, the verification is considered as passing. $Z_1$ is a security parameter available to or shared by both the old authenticator and the AAA server.

Further, the AAA server may compare the local security parameter $Z_1$ with the security parameter Z provided by the old authenticator, or compare the locally calculated security parameter $W_1$ with the security parameter W sent by the new authenticator, if they are the same, the verification is considered as passing.

In this step, after the AAA server verifies the new authenticator, the AAA server responds to the authenticator relocation request from the new authenticator. If the authenticator relocation request is accepted, an old MSK corresponding to the MS, i.e., a currently effective MSK for the MS, may be included in the response message. Further, if the authenticator relocation request is accepted, the response message may also include a security parameter U available to both the AAA server and the old authenticator and a security parameter V calculated from the security parameter U.

Step 403: if the new authenticator receives from the AAA server a response indicating that the verification is passed, the new authenticator may send the old authenticator an authenticator relocation complete request, which may include an MS context request. Further, the authenticator relocation complete request may include the security parameter U or the security parameter V.

Step 404: the old authenticator acknowledges the authenticator relocation complete request, and returns an authenticator relocation complete response to the new authenticator when confirming that the new authenticator is trusted.

Further, the old authenticator compares a locally available security parameter $U_1$ or a security parameter $V_1$ calculated from the local security parameter $U_1$ with the security parameter U or V from the new authenticator, and if they are the same, the old authenticator confirms that the new authenticator is trusted. At this time, the old authenticator returns the authenticator relocation complete response, which includes the MS context information requested by the new authenticator, to the new authenticator.

Further, the old authenticator may contain an old MSK corresponding to the MS, i.e., a currently effective MSK for the MS in the response message.

Further, if the authenticator relocation locking state has been set previously, the step may also include: the old authenticator removes the authenticator relocation locking state for the MS. If the re-authentication locking state has been set previously, the step may also include: the old authenticator removes the re-authentication locking state for the MS.

Further, the method may also include step 405: the new authenticator sends an anchor authenticator relocation acknowledgement message to the old authenticator.

Figure 5:
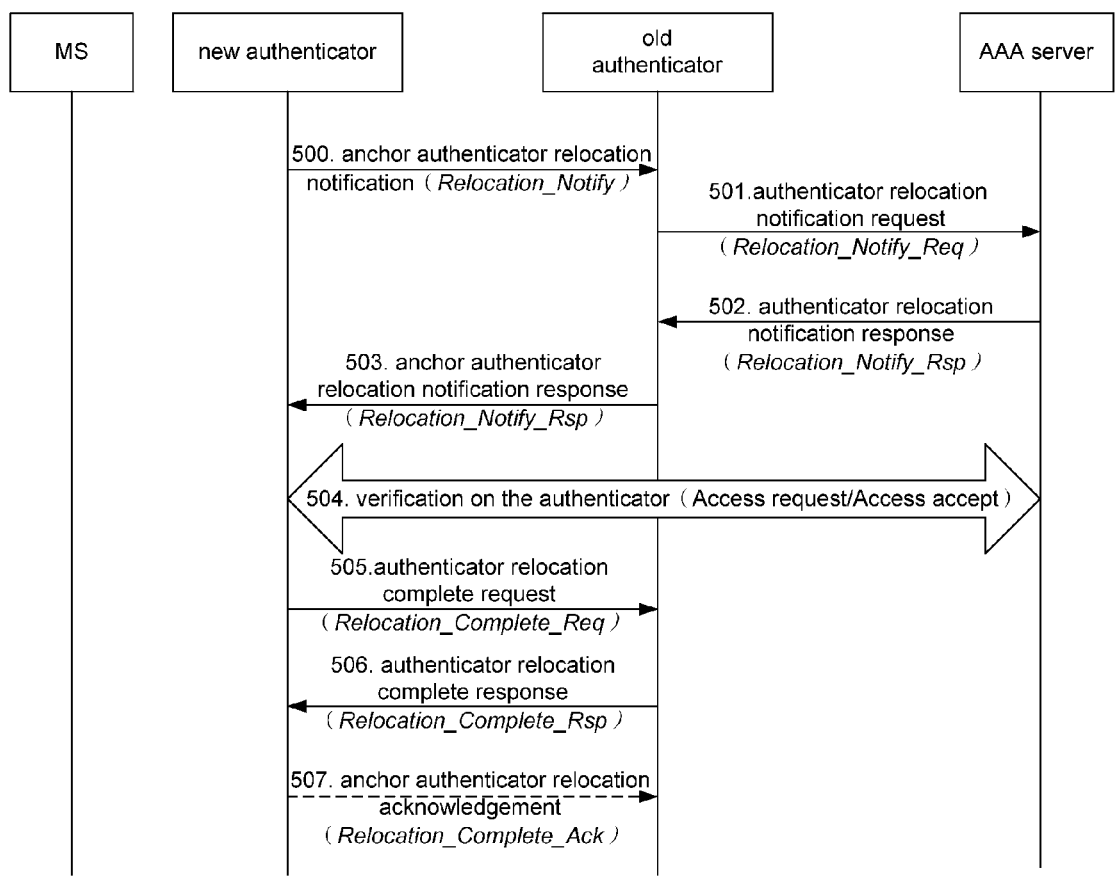
FIG. 5 is a flow chart of the anchor authenticator relocation method according to the second embodiment of the disclosure.

FIG. 5 is a flow chart of the anchor authenticator relocation method according to the second embodiment of the disclosure. FIG. 5 is a flow chart of the anchor authenticator relocation method in a PULL mode according to another embodiment. As shown in FIG. 5, the method according to the second embodiment includes the following steps:

Step 500: a new authenticator sends an old authenticator an anchor authenticator relocation notification message for requesting authenticator relocation, i.e., initiates anchor authenticator relocation of the MS.

Steps 501 to 502: if the old authenticator accepts the current authenticator relocation request, the old authenticator sends the AAA server an authenticator relocation notification message, which notifies the AAA server of the new authenticator to be switched to and of the new authenticator related information, such as the Fully Qualified Domain Name (FQDN) of the new authenticator, or a security parameter $X_1$ provided by the old authenticator, for the AAA server to validate the new authenticator. The AAA server responds to the old authenticator with an authenticator relocation notification response message. $X_1$ may be the MS related parameter information which may be provided by the old authenticator, or may be a security parameter available to both the old and new authenticators, or may be a security parameter calculated from the parameter available to both the old and new authenticators.

The AAA server responds to the old authenticator with an authenticator relocation notification response.

Step 503: the old authenticator returns an anchor authenticator relocation notification response to the new authenticator.

In this step, if the old authenticator detects that an act of re-authentication or authenticator relocation is in progress, then the old authenticator rejects the current anchor authenticator relocation request; otherwise, the old authenticator sets an authenticator relocation locking state for the MS, and no longer accepts any other subsequent re-authentication request and/or authenticator relocation request. Further, a re-authentication locking state may be set for the MS, that is, no other subsequent re-authentication request is accepted.

If the old authenticator accepts the current authenticator relocation request, an MS context requested by the new authenticator may be included in the anchor authenticator relocation notification response returned to the new authenticator, wherein the MS context may include at least one of the followings: MS security history, MS authorization context, REG context, and anchor MM context. Further, a security parameter Z may be included in the anchor authenticator relocation notification response. The security parameter Z may be parameter information available to both the old authenticator and the AAA server, or may be a security parameter calculated from the parameter available to both the old authenticator and the AAA server.

Step 504: after the new authenticator receives an acceptance response from the old authenticator, the new authenticator sends the authenticator relocation request to the AAA server, and the AAA server verifies the new authenticator.

In this step, the authenticator relocation request sent to the AAA server may be an RADIUS message or a Diameter message. The RADIUS message or the Diameter message may include an MS NAI. Further, the message may include the FQDN of the new authenticator, or a security parameter X provided by the old authenticator, or a security parameter Y calculated from the security parameter X provided by the old authenticator.

The request sent to the AAA server from the new authenticator may further contain a security parameter Z provided by the old authenticator or a security parameter W calculated from the security parameter Z, and is to request for verification of the AAA server.

In this step, the verification of the AAA server may include: if the security parameter provided by the old authenticator is as same as the security parameter provided by the new authenticator, the verification is considered as passing; or, if the security parameter provided by the new authenticator is as same as the security parameter available form the AAA server, the verification is considered as passing. The verification of the AAA server may specifically include: the AAA server compares the security parameter X received from the new authenticator with the security parameter $X_1$ received from the old authenticator, or compares the security parameter $Y_1$ with the security parameter Y, based on the FQDN of the new authenticator provided by the old authenticator, or a security parameter $X_1$ provided by the old authenticator, or a security parameter $Y_1$ calculated from the security parameter $X_1$, and if they are the same, the verification is considered as passing.

Further, the AAA server may compare the local security parameter $Z_1$ with the security parameter Z provided by the old authenticator, or compare the security parameter $W_1$ calculated from the local security parameter $Z_1$ with the security parameter W sent by the new authenticator, if they are the same, the verification is considered as passing.

In this step, after the AAA server verifies the new authenticator, the AAA server responds to the authenticator relocation request from the new authenticator. If the authenticator relocation request is accepted, an old MSK corresponding to the MS, i.e., a currently effective MSK for the MS, may be included in the response message. Further, if the authenticator relocation request is accepted, the response message may also include a security parameter U available to both the AAA server and the old authenticator or a security parameter V calculated from the security parameter U.

Step 505: if the new authenticator receives from the AAA server a response indicating that the verification is passed, the new authenticator may send the old authenticator an authenticator relocation complete request, which may include an MS context request. Further, the authenticator relocation complete request may include the security parameter U or the security parameter V.

Step 506: the old authenticator acknowledges the authenticator relocation complete request, and returns an authenticator relocation complete response to the new authenticator when confirming that the new authenticator is trusted.

Further, the old authenticator compares a locally available security parameter U1 or a security parameter V1 calculated from the local security parameter U1 with the security parameter U or V from the new authenticator, and if they are the same, the old authenticator confirms that the new authenticator is trusted. At this time, the old authenticator returns the authenticator relocation complete response, which includes the MS context information requested by the new authenticator, to the new authenticator.

Further, the old authenticator may contain an old MSK corresponding to the MS, i.e., a currently effective MSK for the MS in the response message.

Further, if the authenticator relocation locking state has been set previously, the step may also include: the old authenticator removes the authenticator relocation locking state for the MS. If the re-authentication locking state has been set previously, the step may also include: the old authenticator removes the re-authentication locking state for the MS.

Further, the method may also include step 507: the new authenticator sends an anchor authenticator relocation acknowledgement message to the old authenticator.

Figure 6:
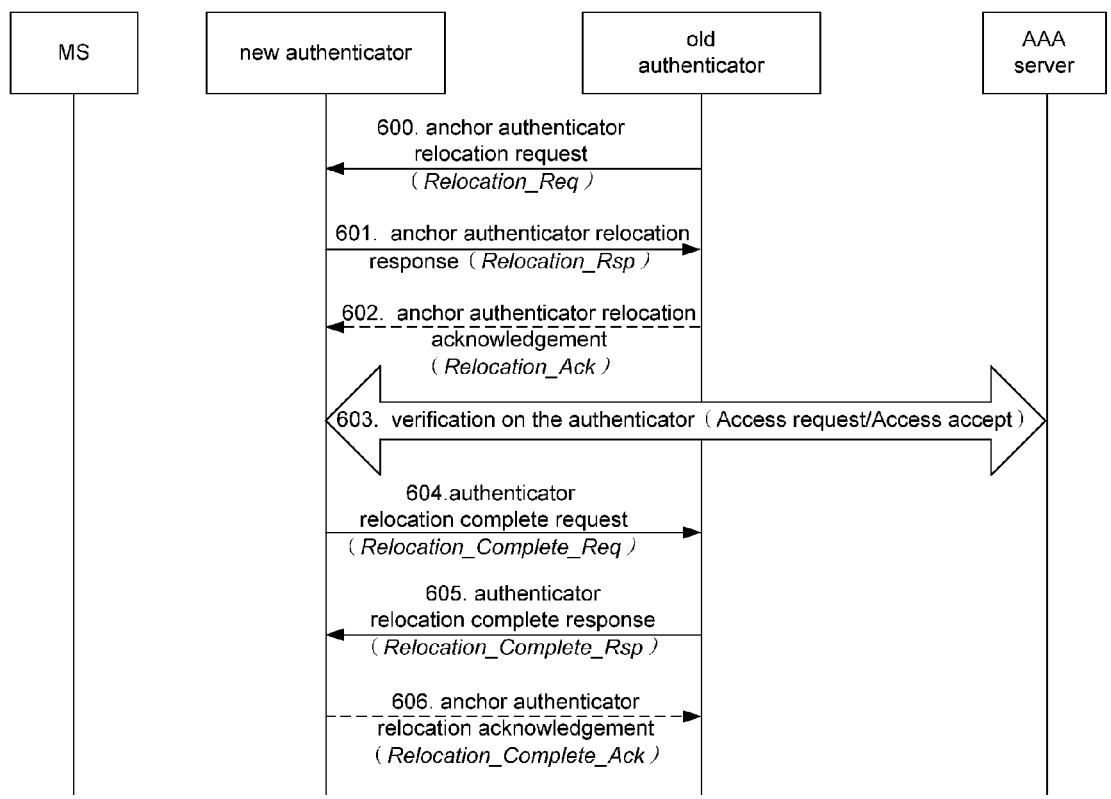
FIG. 6 is a flow chart of the anchor authenticator relocation method according to the third embodiment of the disclosure.

FIG. 6 is a flow chart of the anchor authenticator relocation method according to the third embodiment of the disclosure. FIG. 6 is a flow chart of the anchor authenticator relocation method in a PUSH mode. As shown in FIG. 6, the method according to the third embodiment includes the following steps:

Step 600: a new authenticator sends an old authenticator an anchor authenticator relocation request, i.e., anchor authenticator relocation of the MS.

In this step, if the old authenticator detects that an act of re-authentication or authenticator relocation is in progress, then the old authenticator does not initiate the current anchor authenticator relocation request; otherwise, the old authenticator sets an authenticator relocation locking state for the MS, and no longer accepts any other subsequent re-authentication request and/or authenticator relocation request. Further, a re-authentication locking state may be set for the MS, that is, no other subsequent re-authentication request is accepted.

Further, the old authenticator may contain an MS part context in the anchor authenticator relocation request message to be sent to the new authenticator, wherein the MS part context may include at least one of the followings: MS security history, MS authorization context, REG context, and anchor MM context. Further, the old authenticator may include a security parameter Z. The security parameter Z may be parameter information available to both the old authenticator and the AAA server, or may be a security parameter calculated from the parameter available to both the old authenticator and the AAA server.

Step 601: the new authenticator sends an anchor authenticator relocation response to the old authenticator to request for the MS context.

Further, the method may also include step 602: the old authenticator may contain an MS part context in the anchor authenticator relocation request message to be sent to the new authenticator, wherein the MS part context may include at least one of the followings: MS security history, MS authorization context, REG context, and anchor MM context. Further, the old authenticator may include a security parameter Z. The security parameter Z may be parameter information available to both the old authenticator and the AAA server, or may be a security parameter calculated from the parameter available to both the old authenticator and the AAA server.

The specific implementations of steps 603 to 606 are identical to those of steps 402 to 405 and thus the description will be omitted here.

Figure 7:
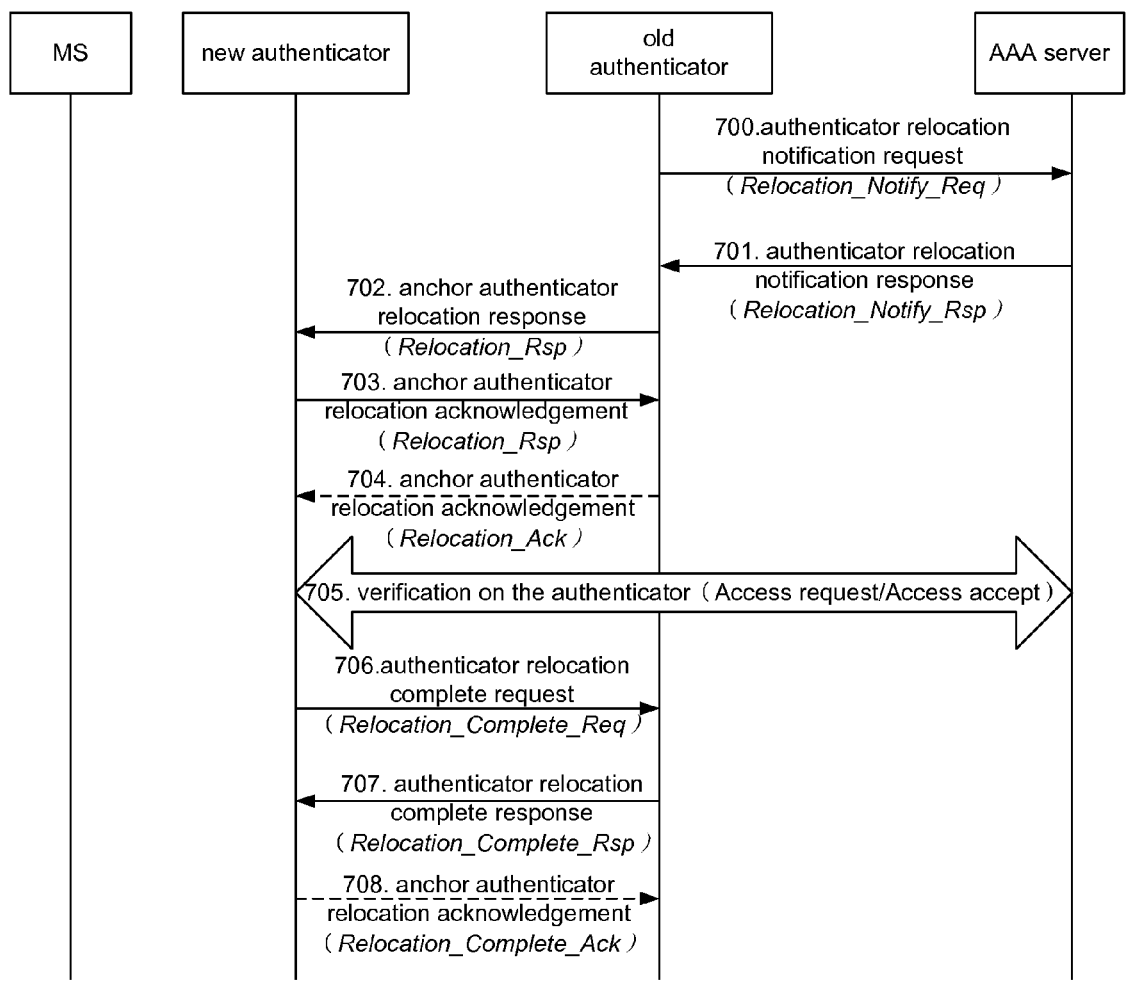
FIG. 7 is a flow chart of the anchor authenticator relocation method according to the fourth embodiment of the disclosure.

FIG. 7 is a flow chart of the anchor authenticator relocation method according to the fourth embodiment of the disclosure. FIG. 7 is a flow chart of the anchor authenticator relocation method in a PUSH mode according to another embodiment. As shown in FIG. 7, the method according to the fourth embodiment includes the following steps:

Steps 700 to 701: if the old authenticator needs to initiate an authenticator relocation request, the old authenticator sends the AAA server an authenticator relocation notification request message, which notifies the AAA server of the new authenticator to be switched to and of the new authenticator related information, such as the Fully Qualified Domain Name (FQDN) of the new authenticator, or a security parameter $X_1$ provided by the old authenticator, so as for the AAA server to verify the new authenticator. The AAA server responds to the old authenticator with an authenticator relocation notification response message. $X_1$ may be the MS related parameter information which may be provided by the old authenticator, or may be a security parameter available to both the old and new authenticators, or may be a security parameter calculated from the parameter available to both the old and new authenticators.

In this step, if the old authenticator detects that an act of re-authentication or authenticator relocation is in progress, then the old authenticator does not initiate the current anchor authenticator relocation request; otherwise, the old authenticator sets an authenticator relocation locking state for the MS, and no longer accepts any other subsequent re-authentication request and/or authenticator relocation request. Further, a re-authentication locking state may be set for the MS, that is, no other subsequent re-authentication request is accepted.

Step 702: an old authenticator sends a new authenticator an anchor authenticator relocation request, i.e., anchor authenticator relocation of the MS.

Further, the old authenticator may contain an MS part context in the anchor authenticator relocation request message to be sent to the new authenticator, wherein the MS part context may include at least one of the followings: MS security history, MS authorization context, REG context, and anchor MM context. Further, the old authenticator may include a security parameter Z. The security parameter Z may be parameter information available to both the old authenticator and the AAA server, or may be a security parameter calculated from the parameter available to both the old authenticator and the AAA server.

Step 703: the new authenticator sends an anchor authenticator relocation response to the old authenticator to request for the MS context.

Further, the method may also include step 704: the old authenticator may contain an MS part context in the anchor authenticator relocation acknowledgement message to be sent to the new authenticator, wherein the MS part context may include at least one of the followings: MS security history, MS authorization context, REG context, and anchor MS context. Further, the old authenticator may include a security parameter Z in the response message. The security parameter Z may be parameter information available to both the old authenticator and the AAA server, or may be a security parameter calculated from the parameter available to both the old authenticator and the AAA server.

The specific implementations of steps 705 to 708 are identical to those of steps 402 to 405 and thus the description will be omitted here.

What are described above are just preferred embodiments of the disclosure and are not intended to limit the scope of the disclosure. Any amendments, equivalent substitutions and modifications without departing from principle of the disclosure shall fall within the scope of the disclosure.

The invention claimed is:

1. An anchor authenticator relocation method, comprising:
under a scenario of anchor authenticator relocation without a Mobile Station (MS) re-authentication, after an old authenticator accepts an anchor authenticator relocation request of the MS, sending, by a new authenticator, an authenticator relocation request to an Authentication, Authorization and Accounting (AAA) server;
when the AAA server's verification on the new authenticator is passed and the old authenticator confirms that the new authenticator is trusted, relocating the anchor authenticator to the new authenticator,
wherein relocating the anchor authenticator to the new authenticator when the old authenticator confirms that the new authenticator is trusted comprises:
requesting, by the new authenticator, an MS context from the old authenticator; and
returning, by the old authenticator when confirming that the new authenticator is trusted, the MS context and an old Master Session Key (MSK) corresponding to the MS to the new authenticator.

2. The anchor authenticator relocation method according to claim 1, wherein before the old authenticator accepts the anchor authenticator relocation request of the MS, or after the old authenticator accepts the anchor authenticator relocation request of the MS and before the new authenticator sends the anchor authenticator relocation request to the AAA server, the method further comprises:
sending, by the old authenticator, a notification message to the AAA server, to notify the AAA server of the new authenticator to be switched to and of the new authenticator related information or a security parameter $X_1$ provided by the old authenticator, so as for the AAA server to verify the new authenticator.

3. The anchor authenticator relocation method according to claim 1, wherein the anchor authenticator relocation request is initiated by the new authenticator or the old authenticator.

4. The anchor authenticator relocation method according to claim 3, further comprising: rejecting, by the old authenticator, the anchor authenticator relocation request, when detecting that an act of re-authentication or authenticator relocation is in progress.

5. The anchor authenticator relocation method according to claim 4, wherein the old authenticator detects whether the act of re-authentication or authenticator relocation is in progress in the following way:
setting in the old authenticator an anchor authenticator relocation locking state identifier for the MS, and when the anchor authenticator relocation locking state identifier indicates a locking state, rejecting any other authenticator relocation request and/or re-authentication request until the authenticator relocation locking state is removed; or
setting in the old authenticator a counter for the MS, and when a value of the counter is an odd number, rejecting any other authenticator relocation request and/or re-authentication request; or
when the act of authenticator relocation of the MS occurs in the old authenticator, setting in the old authenticator a timer for the MS, and rejecting any other authenticator relocation request and/or re-authentication request until the timer runs out of time.

6. The anchor authenticator relocation method according to claim 5, further comprising: setting, by the old authenticator, a re-authentication locking state for the MS,
wherein in the re-authentication locking state, no other re-authentication is accepted.

7. The anchor authenticator relocation method according to claim 2, wherein the passing of the AAA server's verification on the new authenticator comprises:
verifying, by the AAA server, the new authenticator by using a security parameter under a Remote Authentication Dial In User Service (RADIUS) protocol or a Diameter protocol; and
when the security parameter provided by the old authenticator is identical to the security parameter provided by the new authenticator, regarding the verification as passing.

8. The anchor authenticator relocation method according to claim 7, wherein the verification comprises:
sending, by the new authenticator, the authenticator relocation request to the AAA server, and requesting a verification of said authenticator relocation request from the AAA server; wherein the authenticator relocation request comprises: one of a Network Access Identifier (NAI) for the MS, a security parameter Z provided by the old authenticator and a security parameter W calculated from the security parameter Z;
determining, by the AAA server, whether one of an available security parameter, a security parameter $Z_1$ local to the AAA server or a security parameter W calculated from the local security parameter $Z_1$ is identical to the security parameter from the new authenticator, and if yes, regarding the verification as passing.

9. The anchor authenticator relocation method according to claim 8, wherein the authenticator relocation request sent to the AAA server by the new authenticator further comprises one of a Fully Qualified Domain Name (FQDN) of the new authenticator, a security parameter X provided by the old authenticator, and a security parameter Y calculated from the security parameter X provided by the old authenticator; and
wherein the verification further comprises: determining whether the security parameter X received from the new authenticator is identical to a security parameter $X_1$ received from the old authenticator, or whether a security parameter $Y_1$ calculated from the security parameter $X_1$ is identical to the security parameter Y, based on the FQDN of the new authenticator provided by the old authenticator, or the security parameter $X_1$ provided by the old authenticator, or the security parameter $Y_1$ calculated from the security parameter $X_1$, and if yes, regarding the verification as passing.

10. The anchor authenticator relocation method according to claim 1, wherein the confirming that the new authenticator is trusted comprises:
returning to the old authenticator, by the new authenticator, a security parameter U or a security parameter V acquired from the AAA server;
determining, by the old authenticator, whether a locally available security parameter $U_1$ is identical to the security parameter U from the new authenticator, or whether a security parameter $V_1$ calculated from the local security parameter $U_1$ is identical to security parameter V from the new authenticator, and if yes, confirming that the new authenticator is trusted.

11. The anchor authenticator relocation method according to claim 10, further comprising:

where an authenticator relocation locking state has been set previously, removing the authenticator relocation locking state for the MS; and where a re-authentication locking state has been set previously, removing the re-authentication locking state for the MS.

12. The anchor authenticator relocation method according to claim 1, further comprising:

sending, by the new authenticator, an authenticator relocation complete acknowledgement message to the old authenticator; and clearing up, by the old authenticator, the MS related information, when acknowledging that the relocation is successfully completed.

13. An anchor authenticator relocation system, comprising at least a new authenticator, an old authenticator and an Authentication, Authorization and Accounting (AAA) server, wherein the new authenticator is configured to interact with the old authenticator under a scenario of anchor authenticator relocation without a Mobile Station (MS) re-authentication, to send an authenticator relocation request of the MS to the AAA server after the old authenticator accepts an anchor authenticator relocation request, and to request the old authenticator to perform the authenticator relocation upon receipt of a verification pass response from the AAA server;

the old authenticator is configured to interact with the new authenticator, to determine whether to accept the anchor authenticator relocation request of the MS, to send an authenticator relocation success or complete response to the new authenticator when determining the new authenticator is trusted, and to relocate the anchor authenticator to the new authenticator; and the AAA server is configured to verify the new authenticator and to send a verification pass response to the new authenticator when the verification is passed, wherein the new authenticator is further configured to request an MS context from the old authenticator; and the old authenticator is further configured to return the MS context and an old Master Session Key (MSK) corresponding to the MS to the new authenticator, when confirming that the new authenticator is trusted;

wherein each of the new authenticator, the old authenticator and the AAA server is a component that comprises a computer processor and a memory, the respective memory storing computer-readable instructions that when executed by the respective computer processor implement the functions of the respective components.

14. The anchor authenticator relocation system according to claim 13, wherein the old authenticator is further configured to reject the anchor authenticator relocation request, when detecting that an act of re-authentication or authenticator relocation is in progress.

15. The anchor authenticator relocation system according to claim 14, wherein the old authenticator is further configured to set an authenticator relocation locking state for the MS when accepting the anchor authenticator relocation request, and accordingly, to remove the authenticator relocation locking state for the MS when confirming that the new authenticator is trusted.

16. The anchor authenticator relocation system according to claim 15, wherein the old authenticator is specifically configured to:

set an anchor authenticator relocation locking state identifier for the MS, and reject any other authenticator relocation request and/or re-authentication request until the authenticator relocation locking state is removed, when the anchor authenticator relocation locking state identifier indicates a locking state; or set a counter for the MS, and reject any other authenticator relocation request and/or re-authentication request when a value of the counter is an odd number; or set in the old authenticator a timer for the MS when the authenticator relocation of the MS occurs in the old authenticator, and reject any other authenticator relocation request and/or re-authentication request until the timer runs out of time;

wherein the old authenticator is further configured to set a re-authentication locking state for the MS, and accordingly, to remove the re-authentication locking state for the MS when confirming that the new authenticator is trusted.

17. The anchor authenticator relocation system according to claim 13, wherein the old authenticator is further configured to send the AAA server a notification message, which notifies the AAA server of the new authenticator to be switched to and of the new authenticator related information or a security parameter provided by the old authenticator, so as for the AAA server to verify the new authenticator.

18. The anchor authenticator relocation system according to claim 17, wherein the new authenticator is further configured to send an authenticator relocation complete acknowledgement message to the old authenticator.

19. The anchor authenticator relocation system according to claim 18, wherein the old authenticator is further configured to clear up the MS related information when acknowledging that the authenticator relocation is successfully completed.

20. The anchor authenticator relocation system according to claim 19, wherein the old authenticator is further configured to initiate a process causing the MS to exit a network when acknowledging that the authenticator relocation is rejected or failed.

* * * * *